US011487328B1

(12) United States Patent
Gu

(10) Patent No.: US 11,487,328 B1
(45) Date of Patent: Nov. 1, 2022

(54) MULTI-SCREEN DISPLAY DEVICE WITH INTERNAL WIRING

(71) Applicant: Shenzhen E-Tech Digital Technology Co., Ltd., Shenzhen (CN)

(72) Inventor: Yang Gu, Shenzhen (CN)

( * ) Notice: Subject to any disclaimer, the term of this patent is extended or adjusted under 35 U.S.C. 154(b) by 21 days.

(21) Appl. No.: 17/331,592

(22) Filed: May 26, 2021

(30) Foreign Application Priority Data

May 14, 2021 (CN) .......................... 202121039415.1

(51) Int. Cl.
*G06F 1/16* (2006.01)

(52) U.S. Cl.
CPC ............ *G06F 1/1647* (2013.01); *G06F 1/165* (2013.01); *G06F 1/1616* (2013.01); *G06F 1/1641* (2013.01); *G06F 1/1649* (2013.01); *G06F 1/1683* (2013.01); *G06F 1/1681* (2013.01)

(58) Field of Classification Search
CPC .... G06F 1/1616; G06F 1/1641; G06F 1/1647; G06F 1/1649; G06F 1/165; G06F 1/1683
See application file for complete search history.

(56) References Cited

U.S. PATENT DOCUMENTS

| | | | | |
|---|---|---|---|---|
| 5,768,096 A * | 6/1998 | Williams | ............... | G06F 1/1616 361/679.04 |
| 6,302,612 B1 * | 10/2001 | Fowler | .................. | G06F 1/1683 16/224 |
| 6,859,219 B1 * | 2/2005 | Sall | ........................ | G06F 1/1683 345/905 |
| 10,817,020 B1 * | 10/2020 | DeMaio | ................. | G06F 3/1423 |
| 2011/0298690 A1 * | 12/2011 | Reilly | .................... | G06F 1/1649 345/1.1 |
| 2019/0227598 A1 * | 7/2019 | Miele | ..................... | G06F 1/1681 |
| 2021/0080999 A1 * | 3/2021 | Bryant | ................. | F16M 13/005 |

* cited by examiner

*Primary Examiner* — Nidhi Thaker

(57) ABSTRACT

The present disclosure relates to a multi-screen display device with internal wiring. The multi-screen display device comprises a clamping frame, a circuit board and at least two display units, wherein the clamping frame is configured to be fixed on a screen to be extended, the circuit board is provided inside the clamping frame and is configured to be connected to a host end of the screen to be extended, and the display units are rotatably connected to the clamping frame respectively; and the circuit board is connected to the display units through wire harnesses in the clamping frame, respectively, and the wire harnesses are configured to transmit data and electric power to the display units. When the device of the present disclosure is in use, external wire harnesses only need to be directly connected to the circuit board without being connected to the display units respectively, so that wire harnesses used externally are reduced, the messiness of the wire harnesses is reduced, the convenience of use is improved, and the user experience is improved as well. An internal wire harness plugged into the circuit board will penetrate through a through hole of a tie rod. When the clamping frame is extended, the wire harness will not be directly observed. The integrity of the entire product is improved, and the wire harness can also be effectively protected.

9 Claims, 7 Drawing Sheets

MULTI-SCREEN DISPLAY DEVICE WITH INTERNAL WIRING

TECHNICAL FIELD

The present disclosure relates to a multi-screen extended display product, and more specifically a multi-screen display device with internal wiring.

BACKGROUND ART

Common computers include desktops and notebook computers. Normal computers will have at least one display screen. When the screen needs to be extended, a projector or a video data cable is usually used to connect to multiple other separate display screens to achieve multi-screen display. The use of a projector requires a large enough projection plane, which cannot meet the conditions of use in many occasions. However, if multiple separate display screens are used for multi-screen display, the purchase cost is relatively high, and additional operations are required to fix the display screens, and it is also not convenient to carry. Therefore, a portable display means that may be fixed behind an existing display screen of a notebook computer has appeared on the market, and has two extended screens that may be rotated to adjust the angles. In the prior art, the two extended screens need to be connected to the notebook computer separately through a data cable. Therefore, when in use, it is necessary to plug in two data cables in the notebook computer, and placing a lot of wire harnesses on a desktop results in messy, and the user experience is poor, which needs to be improved.

SUMMARY

The purpose of the present disclosure is to overcome the above shortcomings of the prior art and provide a multi-screen display device with internal wiring, which reduces wire harnesses used externally to improve the user experience.

In order to achieve the above purpose, the present disclosure uses the following technical solution: a multi-screen display device with internal wiring, comprising a clamping frame, a circuit board and at least two display units, wherein the clamping frame is configured to be fixed on a screen to be extended, the circuit board is provided inside the clamping frame and is configured to be connected to a host end of the screen to be extended, and the display units are rotatably connected to the clamping frame respectively; and the circuit board is connected to the display units through wire harnesses in the clamping frame, respectively, and the wire harnesses are configured to transmit data and electric power to the display units.

One part of the wire harnesses is provided in the clamping frame, and the other part is provided in the display units, and the wire harnesses penetrate into the display units via connections between the display units and the clamping frame.

The foldable clamping frame is divided into a first clamping portion and a second clamping portion, the first clamping portion is connected to at least one display unit, the second clamping portion is connected to at least one display unit, and the circuit board is provided in the first clamping portion or the second clamping portion; and the first clamping portion and the second clamping portion are connected by at least one tie rod, the first clamping portion and the second clamping portion slide relatively along the length direction of the tie rod, at least one through hole extending along the length direction of the tie rod is provided in at least one tie rod, and at least one wire harness in the clamping frame penetrates through the through hole.

There are at least two tie rods in parallel up and down, one of the tie rods is provided with the through hole, the other of the tie rods is provided with a rack, the first clamping portion or the second clamping portion is provided with a gear, and the gear meshes with the rack.

One end of the upper tie rod is fixed in the first clamping portion and the other end is inserted into the second clamping portion, and the upper tie rod is provided with the through hole; and the lower tie rod is provided with the rack, and one end of the lower tie rod is fixed in the second clamping portion and the other end is inserted into the first clamping portion.

The circuit board is provided inside the second clamping portion, and the wire harness penetrates through the through hole of the upper tie rod and is connected to a display unit corresponding to the first clamping portion.

The lower side of the through hole is provided with an opening groove that is parallel to and communicated with the through hole, and a stopper is provided inside one end of the opening groove to restrict the wire harness in the through hole.

The inner wall of the opening groove is provided with a groove extending along the length direction of the opening groove, the stopper is provided with a corresponding strip-shaped protrusion, and the strip-shaped protrusion is correspondingly inserted into the groove.

The circuit board is provided with at least one socket, and the socket is configured for being plugged into by an external wire harness, thus forming a connection to the host end of the screen to be extended through the external wire harness.

A front face of the clamping frame is provided with a grooved site, side walls of the grooved site are provided with baffles, and when the clamping frame clamps the screen to be extended, the screen to be extended is placed in the grooved site and the baffles are clasped on edges of the screen to be extended.

Compared with the prior art, the present disclosure has the following beneficial effects: by providing the circuit board inside the clamping frame, the circuit board is connected to at least two display units through internal wire harnesses, and external wire harnesses only need to be directly connected to the circuit board without being connected to the display units respectively, so that wire harnesses used externally are reduced, the messiness of the wire harnesses is reduced, there is also no need to plug in too many wire harnesses at the host end of the screen to be extended, the convenience of use is improved, and the user experience is improved as well.

In addition, an internal wire harness plugged into the circuit board will penetrate through a through hole of a tie rod. When the clamping frame is extended, the wire harness will not be directly observed. The integrity of the entire product is improved, and the wire harness can also be effectively protected.

The above description is merely an overview of the technical solution of the present disclosure. In order to understand the technical means of the present disclosure more clearly, it can be implemented in accordance with the content of the specification, and in order to make the above and other purposes, features and advantages of the present disclosure more obvious and easier to understand, preferred embodiments are specifically cited below, which are described in detail as follows.

DETAILED DESCRIPTION OF EMBODIMENTS

Figure 1:
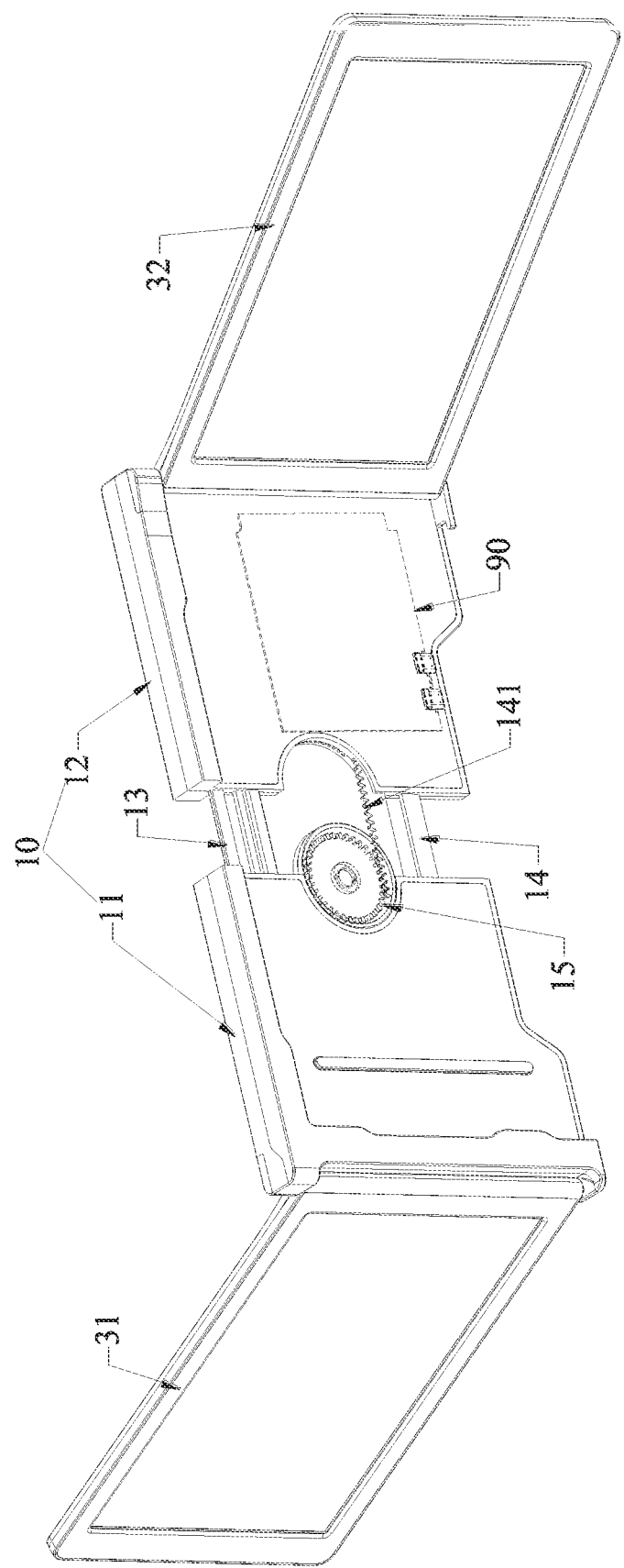
FIG. 1 is a three-dimensional view of a multi-screen display device of the present disclosure.

In order to make the purpose, technical solutions and advantages of the present disclosure clearer, the present disclosure will be further described in detail below with reference to the accompanying drawings and specific embodiments.

The technical solutions in the embodiments of the present disclosure will be clearly and completely described below in conjunction with the accompanying drawings of the embodiments of the present disclosure; and obviously, the embodiments described are merely some, rather than all, of the embodiments of the present disclosure. All other embodiments obtained by those skilled in the art based on the embodiments of the present disclosure without any creative effort shall fall within the protection scope of the present disclosure.

In the description of the present disclosure, it should be understood that the orientation or positional relationship indicated by terms "center", "longitudinal", "transverse", "length", "width", "thickness", "upper", "lower", "front", "rear", "left", "right", "vertical", "horizontal", "top", "bottom", "inside", "outside", "clockwise", "counterclockwise" and the like is based on the orientation or positional relationship shown in the drawings, which is merely for the convenience of describing the present disclosure and for the simplification of the description, and not to indicate or imply that the means or element referred to must have a specific orientation, be constructed and operated in a specific orientation. Therefore, the above terms shall not be construed as a limitation of the present disclosure.

In addition, terms "first" and "second" are merely used for descriptive purposes, and cannot be constructed as indicating or implying relative importance or implicitly indicating the number of indicated technical features. Thus, features defined with "first" and "second" may explicitly or implicitly include one or more of these features. In the description of the present disclosure, the meaning of "a plurality of" is two or more, unless specifically defined otherwise.

In the description of this specification, descriptions with reference to terms "one embodiment", "some embodiments", "an example", "a specific example", or "some examples" etc., mean specific features, structures, materials or characteristics described in conjunction with the embodiment(s) or example(s) are included in at least one embodiment or example of the present disclosure. In this specification, the schematic representation of the above-mentioned terms should not be constructed as necessarily referring to the same embodiment or example. Moreover, the described specific features, structures, materials or characteristics may be combined in any one or more embodiments or examples in a suitable manner. In addition, those skilled in the art may combine different embodiments or examples described in this specification.

Embodiment 1

Embodiment 1 is a multi-screen display device. As shown in FIG. 1, the multi-screen display device comprises a clamping frame 10, a circuit board 90, a display unit 31 and a display unit 32. The display unit 31 and the display unit 32 are respectively rotatably connected to sides of the clamping frame 10. The clamping frame 10 is configured to clamp a screen to be extended, and the circuit board 90 is provided inside the clamping frame 10 and may be connected to a host end of the screen to be extended through an external wire harness. The circuit board 90 is connected to the display unit 31 and the display unit 32 through wire harnesses in the clamping frame 10, and the circuit board 90 transmits data and electric power to the display unit 31 and the display unit 32 through the wire harnesses. With the above structure, external plug-in wire harnesses of the multi-screen display device are reduced, the messiness of the wire harnesses is reduced, and there is also no need to plug in too many wire harnesses at the host end of the screen to be extended, thereby improving the ease of use, and improving the user experience as well. The screen to be extended refers to a screen of a notebook computer.

In Embodiment 1, the clamping frame 10 shown in FIG. 1 is divided into two parts, a left part and a right part, that slide relatively linearly to clamp the screen to be extended, while the circuit board 90 is provided on the right part. In other embodiments, the clamping frame may not be made into a split-type piece, the clamping frame clamps edges of the screen to be extended with clamps, the display unit may be pulled out from the clamping frame and is rotatable, the circuit board is provided in an integrated clamping frame, and an internal wire harness extends from the circuit board to the display unit.

In other embodiments, the number of display units may also be more than two. For example, two smaller display units are hinged to the upper part of the clamping frame and may be rotated from behind the clamping frame, and the left and right sides of the clamping frame are respectively connected to two larger display units.

Embodiment 2

Embodiment 2 is a multi-screen display device. As shown in FIG. 1, the multi-screen display device comprises a clamping frame 10, a circuit board 90, a display unit 31 and a display unit 32. The display unit 31 and the display unit 32 are respectively rotatably connected to sides of the clamping frame 10. The clamping frame 10 is configured to clamp a screen to be extended, and the circuit board 90 is provided inside the clamping frame 10 and may be connected to a host end of the screen to be extended through an external wire harness. The circuit board 90 is connected to the display unit 31 and the display unit 32 through wire harnesses in the clamping frame 10, and the circuit board 90 transmits data and electric power to the display unit 31 and the display unit 32 through the wire harnesses. With the above structure, external plug-in wire harnesses of the multi-screen display device are reduced, the messiness of the wire harnesses is reduced, and there is also no need to plug in too many wire harnesses at the host end of the screen to be extended, thereby improving the ease of use, and improving the user experience as well. The screen to be extended refers to a screen of a notebook computer.

As shown in FIG. 1, the foldable clamping frame 10 is divided into a first clamping portion 11 and a second clamping portion 12. The first clamping portion 11 is hinged to the display unit 31, and the second clamping portion 12 is hinged to the display unit 32. The circuit board 90 is provided inside the second clamping portion 12. The first clamping portion 11 and the second clamping portion 12 are connected by two upper and lower tie rods 13 and 14 parallel to each other. The first clamping portion 11 and the second clamping portion 12 slide relatively along the length direction of the tie rod 13 and the tie rod 14 to adjust the clamping width of the clamping frame 10, so as to adapt to notebook computer screens of different sizes. The lower tie rod 14 is provided with an upward rack 141, and one end of the lower tie rod 14 is fixed in the second clamping portion 12 and the other end is inserted into the first clamping portion 11. A gear 15 is provided in the first clamping portion 11, and the gear 15 meshes with the rack 141. One end of the upper tie rod 13 is fixed in the first clamping portion 11, and the other end is inserted into the second clamping portion 12.

Figure 2:
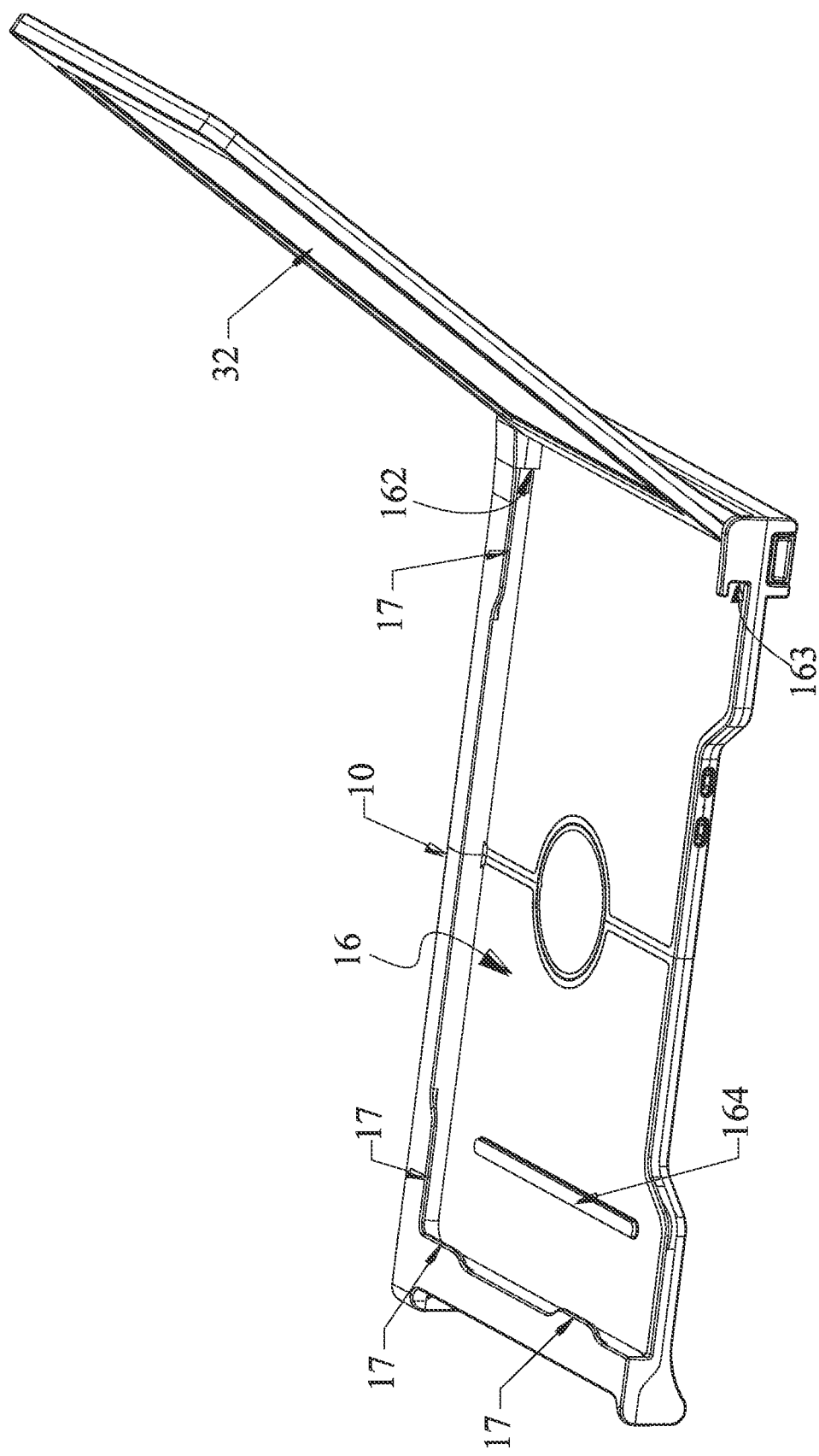
FIG. 2 is a three-dimensional view of a clamping frame and a front display unit of the present disclosure.

As shown in FIG. 2, a front face of the clamping frame 10 is provided with a grooved site 16. Two adjacent side walls of the grooved site 16 are both provided with baffles 17. When the clamping frame 10 clamps the screen to be extended, the screen to be extended is placed in the grooved site 16, edges of the screen to be extended are inserted between the baffles 17 and the bottom surface of the grooved site 16, and the baffles 17 are clasped on the edges of the screen to be extended. The width between the baffle 17 and the bottom surface of the grooved site 16 is set to be greater than the thickness of most notebook computer screens on the market. In FIG. 2, in order to avoid the display unit 32, the right side of the grooved site 16 does not have side walls extending up and down. In the upper right corner of the grooved site 16, there is an inner corner 162, and in the lower right corner of the grooved site, there is a bayonet 163. The inner corner 162 and the bayonet 163 both may be clasped on the right edge of the screen to be extended.

In addition, as shown in FIG. 2, when the clamping frame 10 rotates and folds the display unit 32, the display unit 32 will be placed in the grooved site 16, thus reducing the thickness of the entire product after folding. A foam buffer strip 164 is provided on the surface of the grooved site 16 so that the display unit 32 will not directly touch the bottom surface when it is folded in the grooved site 16, which may reduce noise and reduce wear caused by friction. In addition, a magnet is also provided in the clamping frame 10 to form a magnetic attraction force to fix the display unit 32 folded in the grooved site 16.

Figure 3:
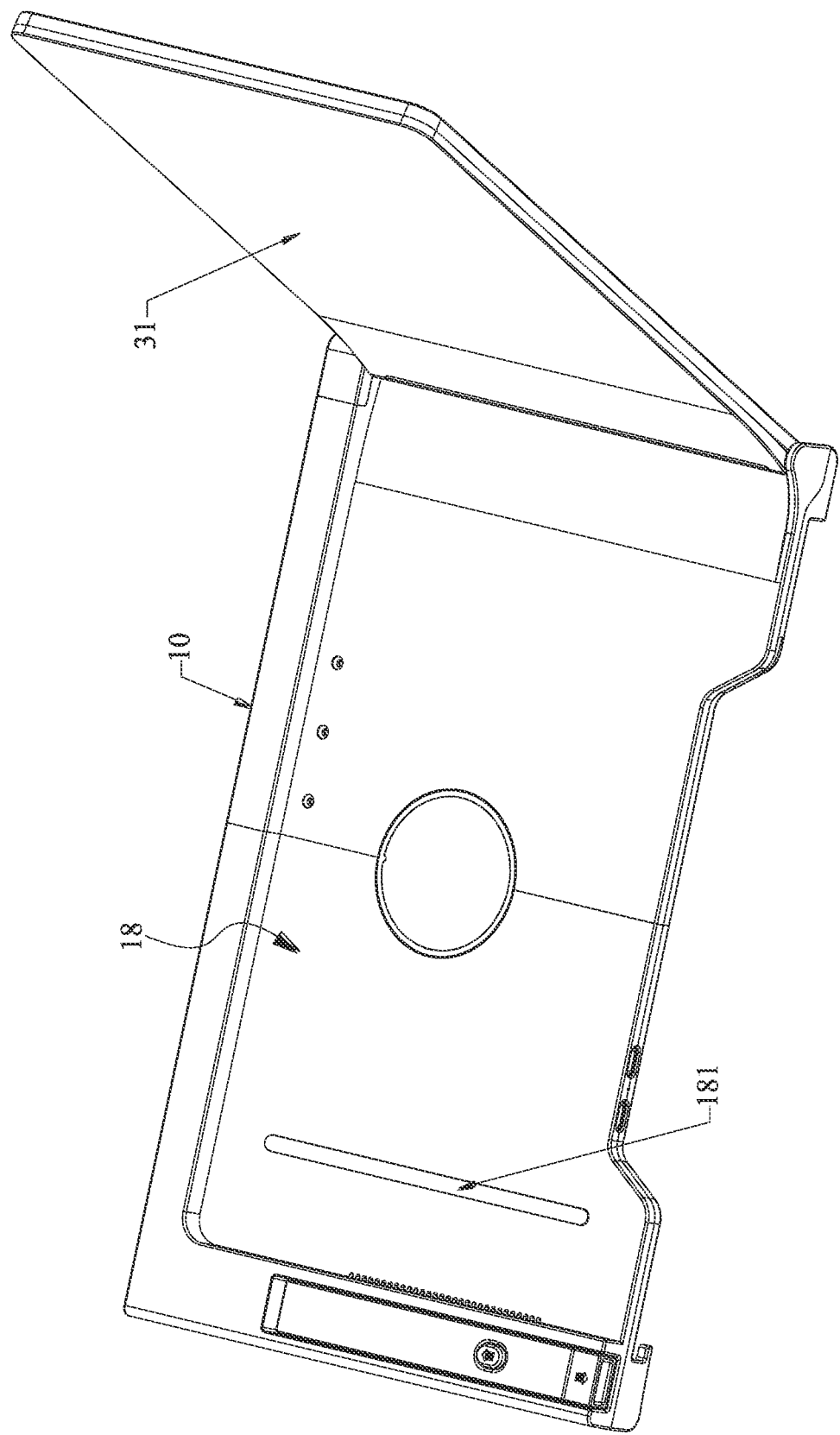
FIG. 3 is a three-dimensional view of a clamping frame and a rear display unit of the present disclosure.

As shown in FIG. 3, a grooved site 18 is also provided at the rear of the clamping frame 10, which may be used to accommodate the display unit 31 after being folded, thereby reducing the thickness of the entire product after being folded. A foam buffer strip 181 is provided on the surface of the grooved site 18 so that the display unit 31 will not directly touch the bottom surface when it is folded in the grooved site 18, thus reducing noise and reducing wear caused by friction. In addition, a magnet is also provided in the clamping frame 10 to form a magnetic attraction force to fix the display unit 31 folded in the grooved site 18.

Figure 4:
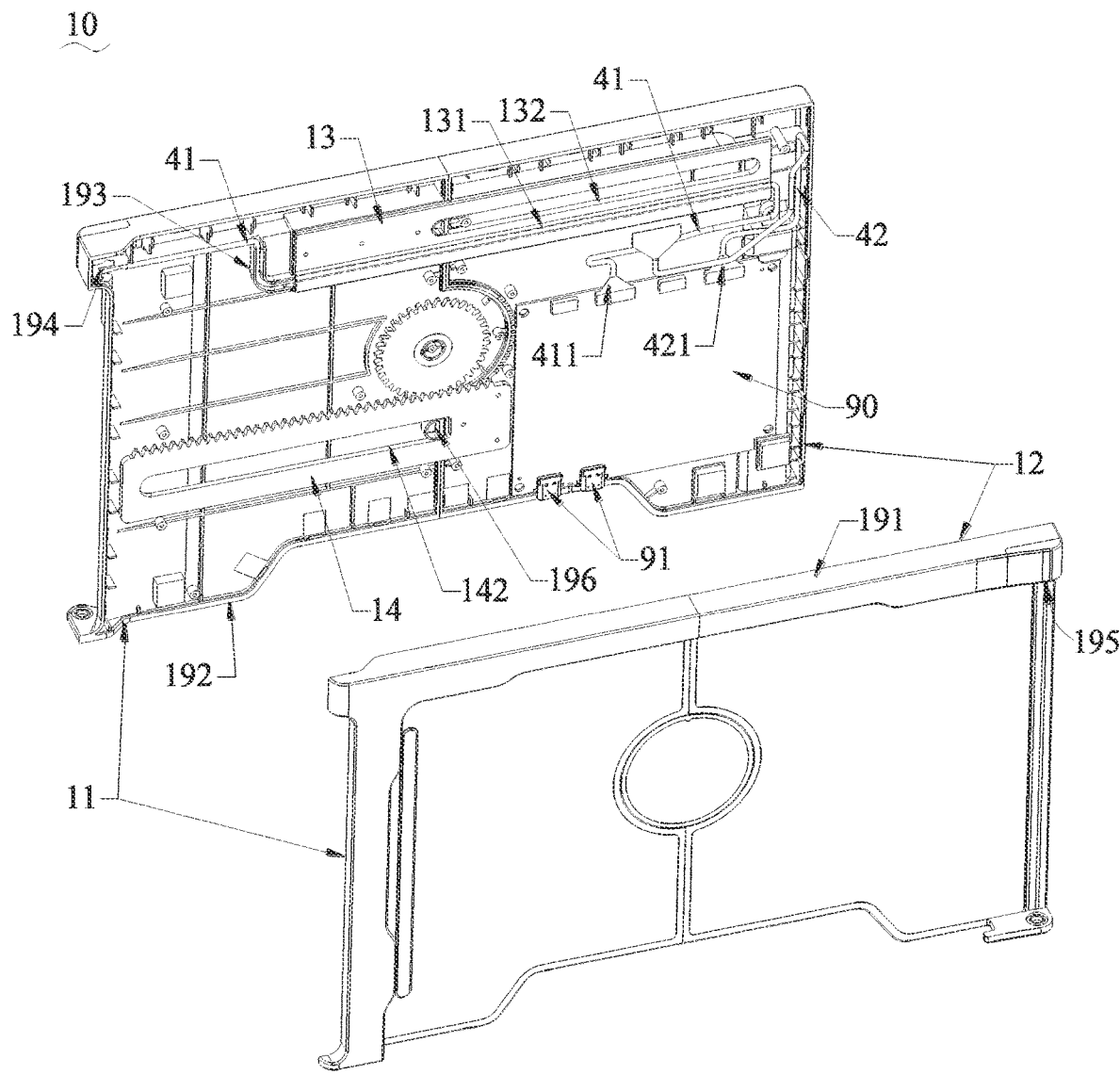
FIG. 4 is an exploded view of a clamping frame of the present disclosure.
Figure 5:
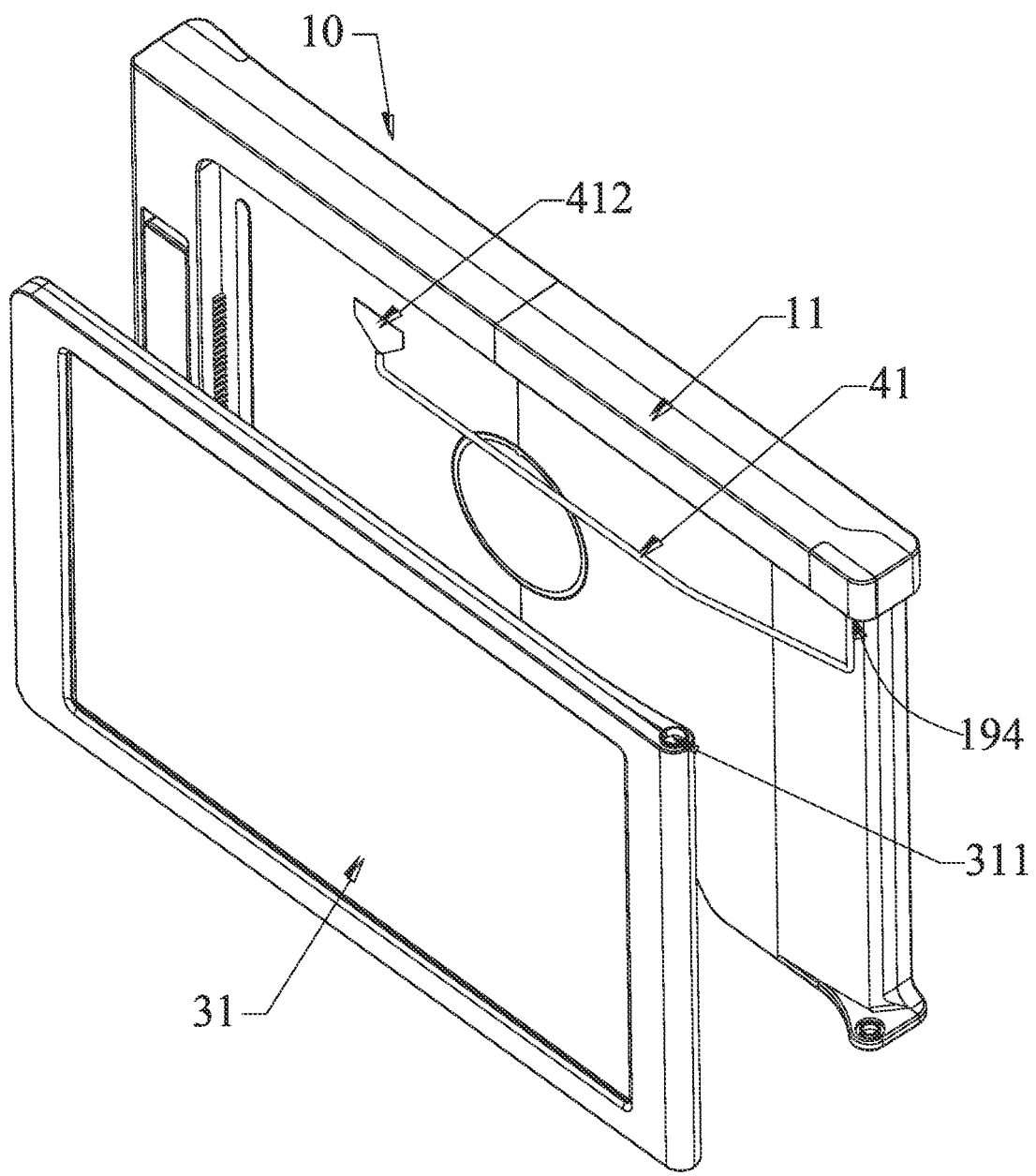
FIG. 5 is an exploded view of a clamping frame and a rear display unit of the present disclosure.

FIG. 4 shows an exploded view of the clamping frame 10. A wire harness 41 and a wire harness 42 are provided in the clamping frame 10. The tie rod 13 is provided with a through hole 131 extending along the length direction of the tie rod 13. The wire harness 41 penetrates through the through hole 131 of the upper tie rod 13 and is connected to a display unit (not shown in FIG. 4) corresponding to the first clamping portion 11. An inner terminal 411 of the wire harness 41 is plugged into the circuit board 90 and then inserted into the through hole 131 of the tie rod 13. A sufficient margin is left between the inner terminal 411 of the wire harness 41 and the tie rod 13 to prevent the clamping frame 10 from generating a tensile force on the wire harness 41 and causing damage when the clamping frame 10 is fully unfolded. The upper tie rod 13 is fixed in the first clamping portion 11 by three screws, while the other end of the tie rod 13 is inserted into the second clamping portion 12 and is movable in the second clamping portion 12. The tie rod 13 is provided with a guide hole 132 extending along the length direction thereof, a guide block is provided on a front plate 191, and the guide block penetrates into the guide hole 132 to limit the tie rod 13 to only horizontally reciprocate and translate. The wire harness 41 passes through one end of the through hole 131 of the tie rod 13 in the first clamping portion 11, and then enters an L-shaped guide groove 193 of the first clamping portion 11. The wire harness 41 coming out of the guide groove 193 extends horizontally to a connection 194 between the first clamping portion 11 of the clamping frame 10 and the display unit. As shown in FIG. 5, the wire harness 41 passing through the connection 194 between the first clamping portion 11 of the clamping frame 10 and the display unit will pass through a shaft opening 311 above the display unit 31 into the display unit 31, and finally an external terminal 412 of the wire harness 41 is plugged into an internal component of the display unit 31.

Figure 6:
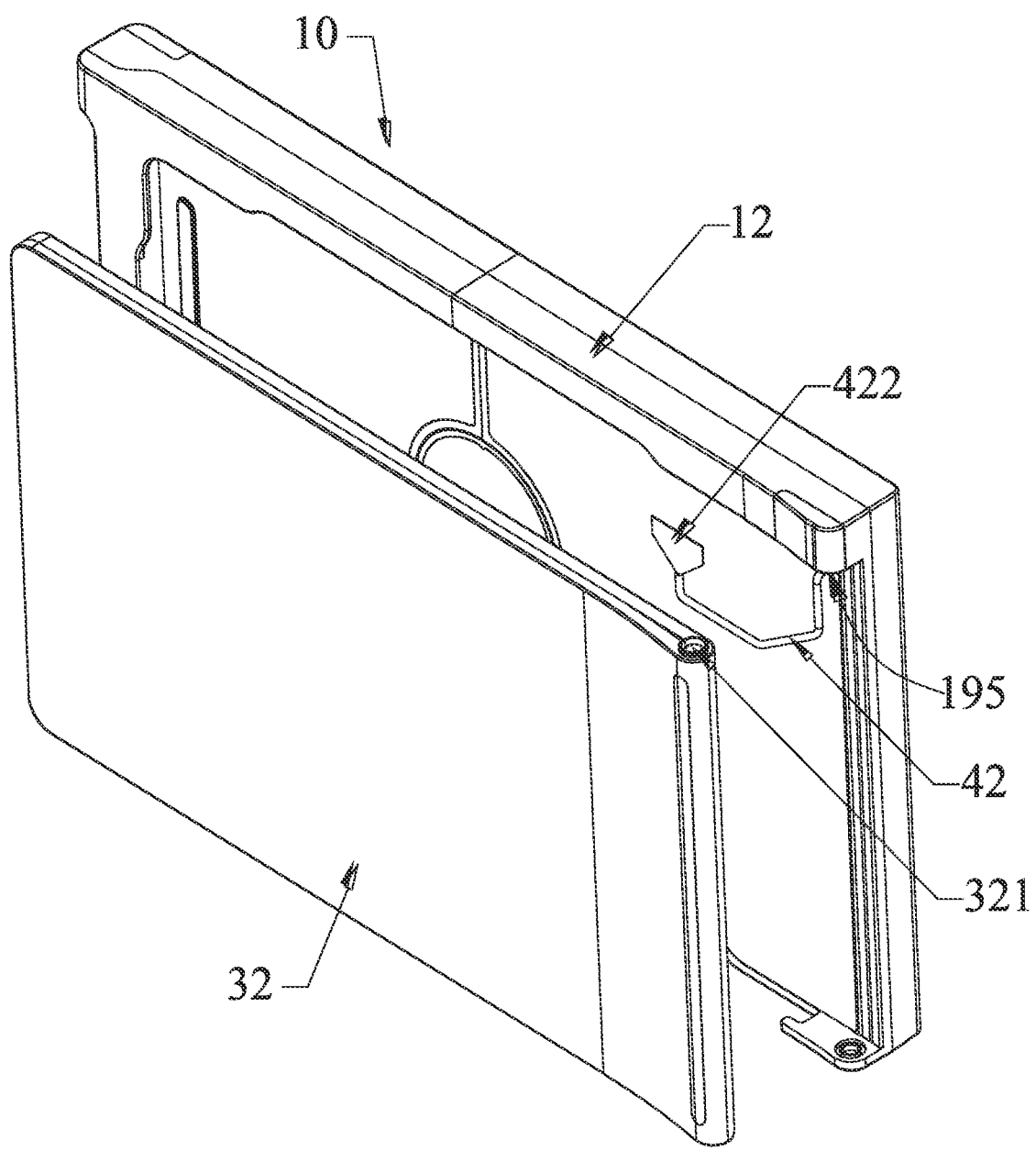
FIG. 6 is an exploded view of a clamping frame and a front display unit of the present disclosure.

In addition, as shown in FIG. 4, an inner terminal 421 of the second wire harness 42 is plugged into the circuit board 90. The wire harness 42 directly extends to a connection 195 between the second clamping portion 12 of the clamping frame 10 and the display unit and passes through it. As shown in FIG. 6, the wire harness 42 passing through the connection between the second clamping portion 12 of the clamping frame 10 and the display unit 32 will pass through a shaft opening 321 above the display unit 32 into the display unit 32, and finally an external terminal 422 of the wire harness 42 is plugged into an internal component of the display unit 32.

In addition, as shown in FIG. 4, one end of the lower tie rod 14 is fixed in the second clamping portion 12 by three screws, and the other end is inserted into the first clamping portion 11. The lower tie rod 14 is provided with a guide hole 142 extending along the length direction thereof, a guide block 196 is provided on a rear plate 192, and the guide block 196 penetrates into the guide hole 142 to limit the tie rod 14 to only horizontally reciprocate and translate. The shape of the guide block of the front plate 191 in FIG. 4 is consistent with the shape of the guide block 196 of the rear plate 192.

As shown in FIG. 4, the circuit board 90 is provided with two sockets 91 side by side. The socket 91 is configured for being plugged into by an external wire harness, thus forming a connection to the host end of the screen to be extended through the external wire harness.

Figure 7:
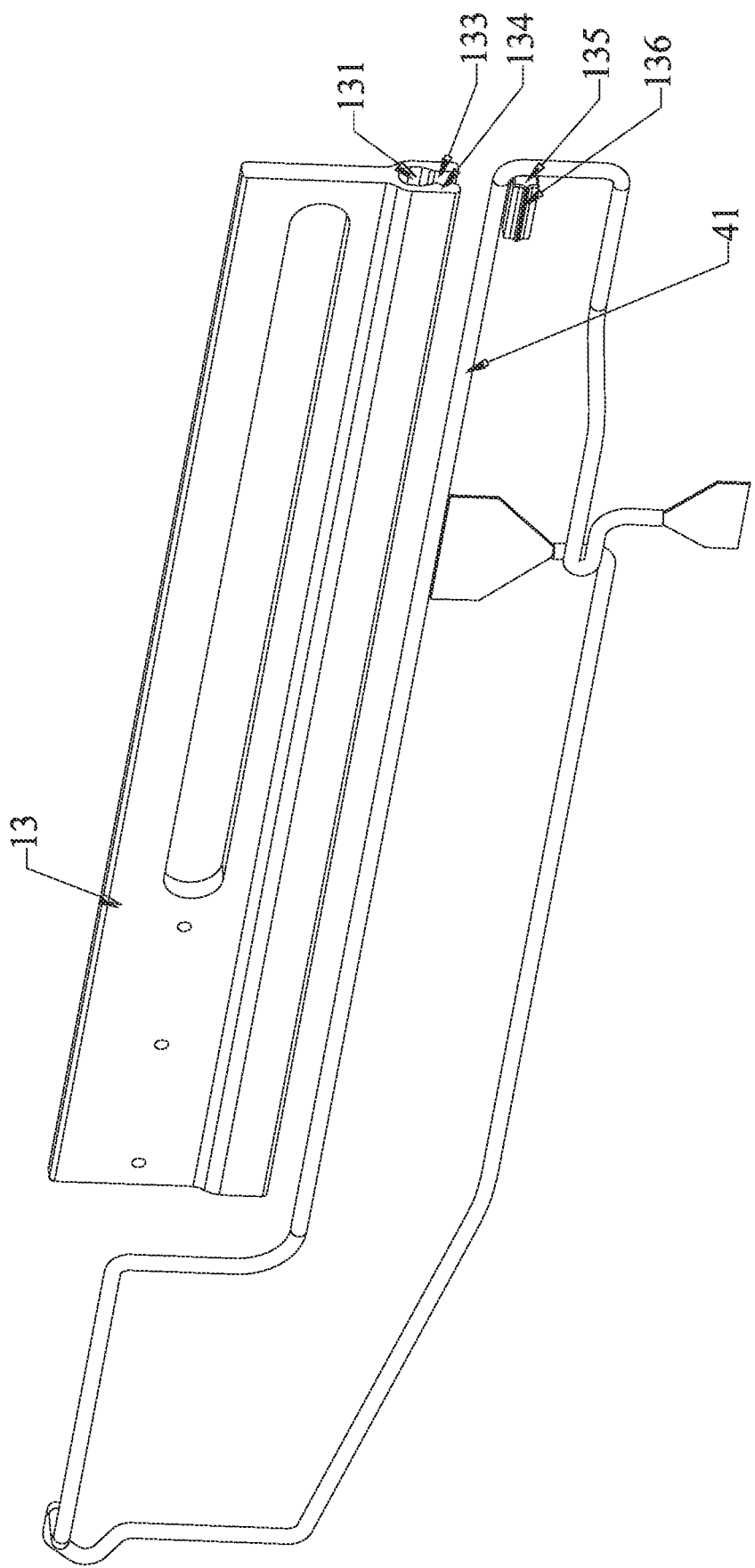
FIG. 7 is an exploded view of a tie rod and one of wire harnesses of the present disclosure.

As shown in FIG. 7, the lower side of the through hole 131 of the tie rod 13 is provided with an opening groove 133 that is parallel to and communicated with the through hole 131. A stopper 135 is provided inside one end of the opening groove 133. The stopper 135 is used to restrict the wire harness 41 in one end of the through hole 131 so that the wire harness 41 cannot escape from the through hole 131. The inner wall of the opening groove 133 is provided with a groove 134 extending along the length direction of the opening groove 133, while the stopper 135 is provided with a corresponding strip-shaped protrusion 136, and the strip-shaped protrusion 136 is correspondingly inserted into the groove 134.

In other embodiments, it is possible to provide only one tie rod, and the tie rod is provided in a middle position and the width of the tie rod is increased. Of course, it is also possible to provide more than two tie rods. When more than one wire harness needs to penetrate, more than one through hole may be provided in the tie rod, or one through hole may be provided on each of more than one tie rod, respectively. It is also possible to provide a through hole and a rack on the same tie rod.

In other embodiments, the first clamping portion may be connected to more than one display unit, and the second clamping portion may be connected to more than one display unit.

In other embodiments, the structures of the first clamping portion and the second clamping portion may be exchanged horizontally with each other, that is, the circuit board is provided in the first clamping portion, and the gear is provided in the second clamping portion. The fixed positions of the two tie rods are also exchanged horizontally, and the arrangement of the wire harnesses is adjusted accordingly.

The above only uses embodiments to further illustrate the technical content of the present disclosure, so as to make it easier for readers to understand, but it does not mean that the implementation of the present disclosure is limited to this. Any technical extension or re-creation made in accordance with the present disclosure is all protected by the present disclosure. The scope of protection of the present disclosure is defined the claims.

The invention claimed is:

1. A multi-screen display device with internal wiring, characterized by comprising a clamping frame, a circuit board and at least two display units, wherein the clamping frame is configured to be fixed on a screen to be extended, the circuit board is provided inside the clamping frame and is configured to be connected to a host end of the screen to be extended, and the display units are rotatably connected to the clamping frame respectively; and the circuit board is connected to the display units through wire harnesses in the clamping frame, respectively, and the wire harnesses are configured to transmit data and electric power to the display units; wherein the foldable clamping frame is divided into a first clamping portion and a second clamping portion, the first clamping portion is connected to at least one display unit, the second clamping portion is connected to at least one display unit, and the circuit board is provided in the first clamping portion or the second clamping portion; and the first clamping portion and the second clamping portion are connected by at least one tie rod, the first clamping portion and the second clamping portion slide relatively along the length direction of the tie rod, at least one through hole extending along the length direction of the tie rod is provided in at least one tie rod, and at least one wire harness in the clamping frame penetrates through the through hole.

2. The multi-screen display device with internal wiring of claim 1, characterized in that one part of the wire harnesses is provided in the clamping frame, and the other part is provided in the display units, and the wire harnesses penetrate into the display units via connections between the display units and the clamping frame.

3. The multi-screen display device with internal wiring of claim 1, characterized in that there are at least two tie rods in parallel up and down, one of the tie rods is provided with the through hole, the other of the tie rods is provided with a rack, the first clamping portion or the second clamping portion is provided with a gear, and the gear meshes with the rack.

4. The multi-screen display device with internal wiring of claim 3, characterized in that one end of the upper tie rod is fixed in the first clamping portion and the other end is inserted into the second clamping portion, and the upper tie rod is provided with the through hole; and the lower tie rod is provided with the rack, and one end of the lower tie rod is fixed in the second clamping portion and the other end is inserted into the first clamping portion.

5. The multi-screen display device with internal wiring of claim 1, characterized in that the circuit board is provided inside the second clamping portion, and the wire harness penetrates through the through hole of the upper tie rod and is connected to a display unit corresponding to the first clamping portion.

6. The multi-screen display device with internal wiring of claim 1, characterized in that the lower side of the through hole is provided with an opening groove that is parallel to and communicated with the through hole, and a stopper is provided inside one end of the opening groove to restrict the wire harness in the through hole.

7. The multi-screen display device with internal wiring of claim 6, characterized in that the inner wall of the opening groove is provided with a groove extending along the length direction of the opening groove, the stopper is provided with a corresponding strip-shaped protrusion, and the strip-shaped protrusion is correspondingly inserted into the groove.

8. The multi-screen display device with internal wiring of claim 1, characterized in that the circuit board is provided with at least one socket, and the socket is configured for being plugged into by an external wire harness, thus forming a connection to the host end of the screen to be extended through the external wire harness.

9. The multi-screen display device with internal wiring of claim 1, characterized in that a front face of the clamping frame is provided with a grooved site, side walls of the grooved site are provided with baffles, and when the clamping frame clamps the screen to be extended, the screen to be extended is placed in the grooved site and the baffles are clasped on edges of the screen to be extended.

* * * * *